United States Patent
Iwamoto

(10) Patent No.: US 8,363,145 B2
(45) Date of Patent: Jan. 29, 2013

(54) MOBILE APPARATUS

(75) Inventor: Rinzo Iwamoto, Tokyo (JP)

(73) Assignee: Fujitsu Toshiba Mobile Communications Limited, Kawasaki (JP)

(*) Notice: Subject to any disclaimer, the term of this patent is extended or adjusted under 35 U.S.C. 154(b) by 378 days.

(21) Appl. No.: 12/722,627

(22) Filed: Mar. 12, 2010

(65) Prior Publication Data

US 2011/0037866 A1    Feb. 17, 2011

(30) Foreign Application Priority Data

Aug. 12, 2009    (JP) ................. P2009-187457

(51) Int. Cl.
*H04N 5/225*    (2006.01)

(52) U.S. Cl. .............. 348/333.11; 348/333.12

(58) Field of Classification Search . 348/333.01–333.12
See application file for complete search history.

(56) References Cited

U.S. PATENT DOCUMENTS

2007/0296820 A1* 12/2007 Lonn ................... 348/207.99
2012/0057064 A1* 3/2012 Gardiner et al. ......... 348/333.12

FOREIGN PATENT DOCUMENTS

| JP | 2003-186462 | * | 7/2003 |
| JP | 2003-186462 A | | 7/2003 |
| JP | 2008-177819 A | | 7/2008 |

* cited by examiner

*Primary Examiner* — Tuan Ho

(74) *Attorney, Agent, or Firm* — Maschoff Gilmore & Israelsen

(57) ABSTRACT

A mobile apparatus is provided with: a display module configured to display an image; a camera disposed on a same side as a side on which the display module is provided and configured to capture a camera image including a user's face; a motion detecting module configured to detect a motion state and a stop state of the mobile apparatus; an image controller configured to determine a face orientation of the user's face from the camera image and control a display orientation of the image to be displayed in the display module; and a camera activating module configured to activate the camera when the motion detecting module detects a change from the motion state to the stop state, and to turn off the camera when the image controller completes a determination on the face orientation.

18 Claims, 4 Drawing Sheets

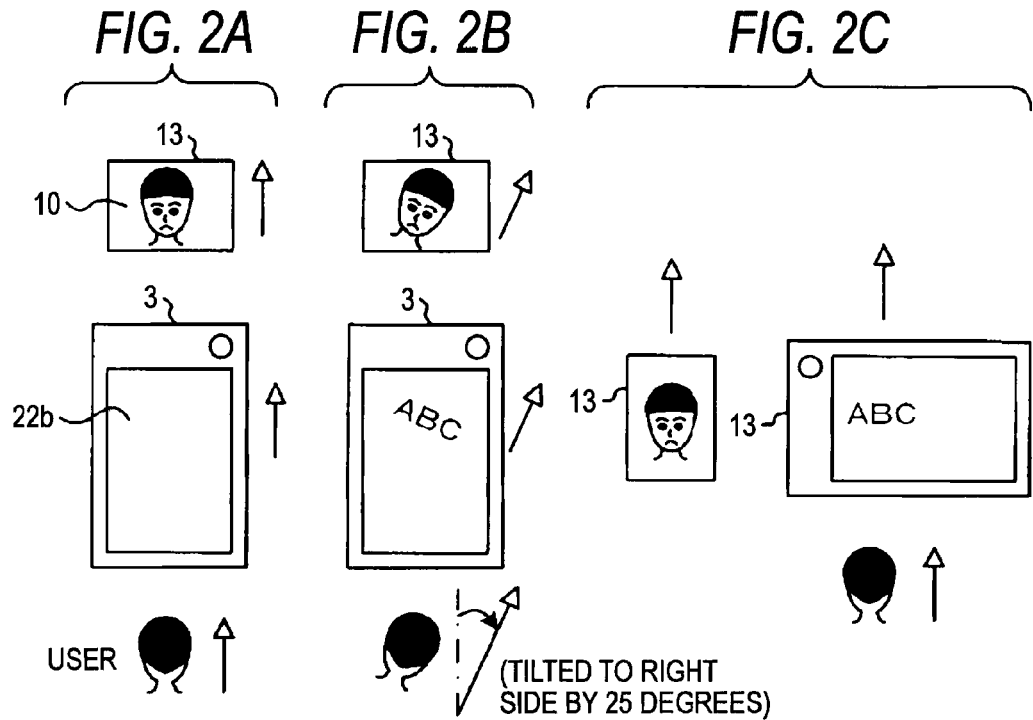
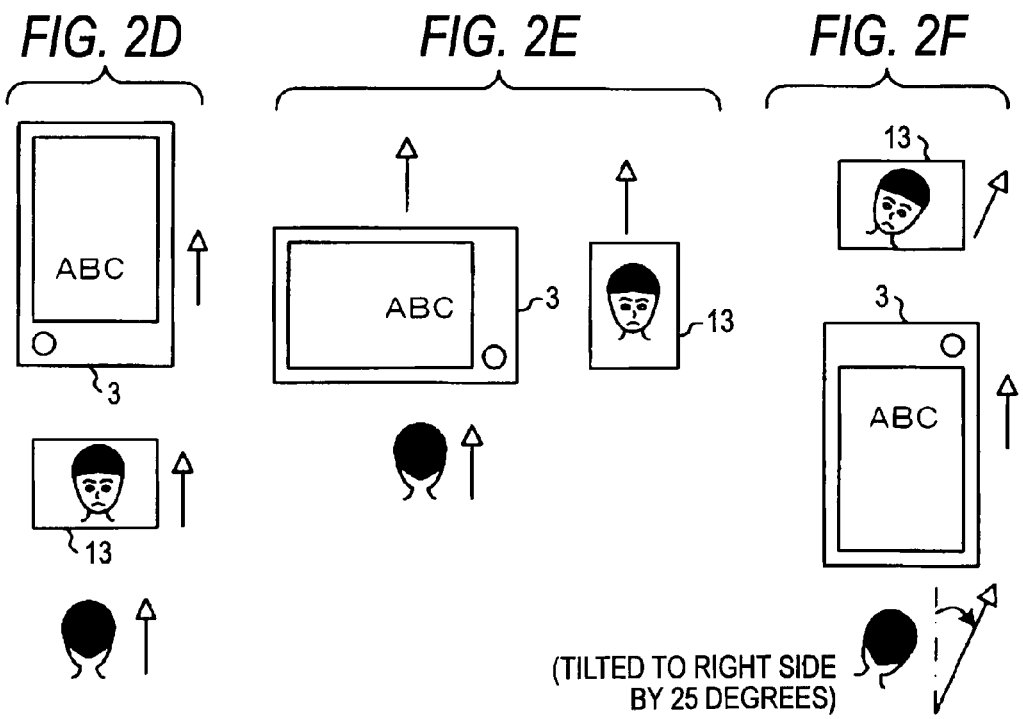

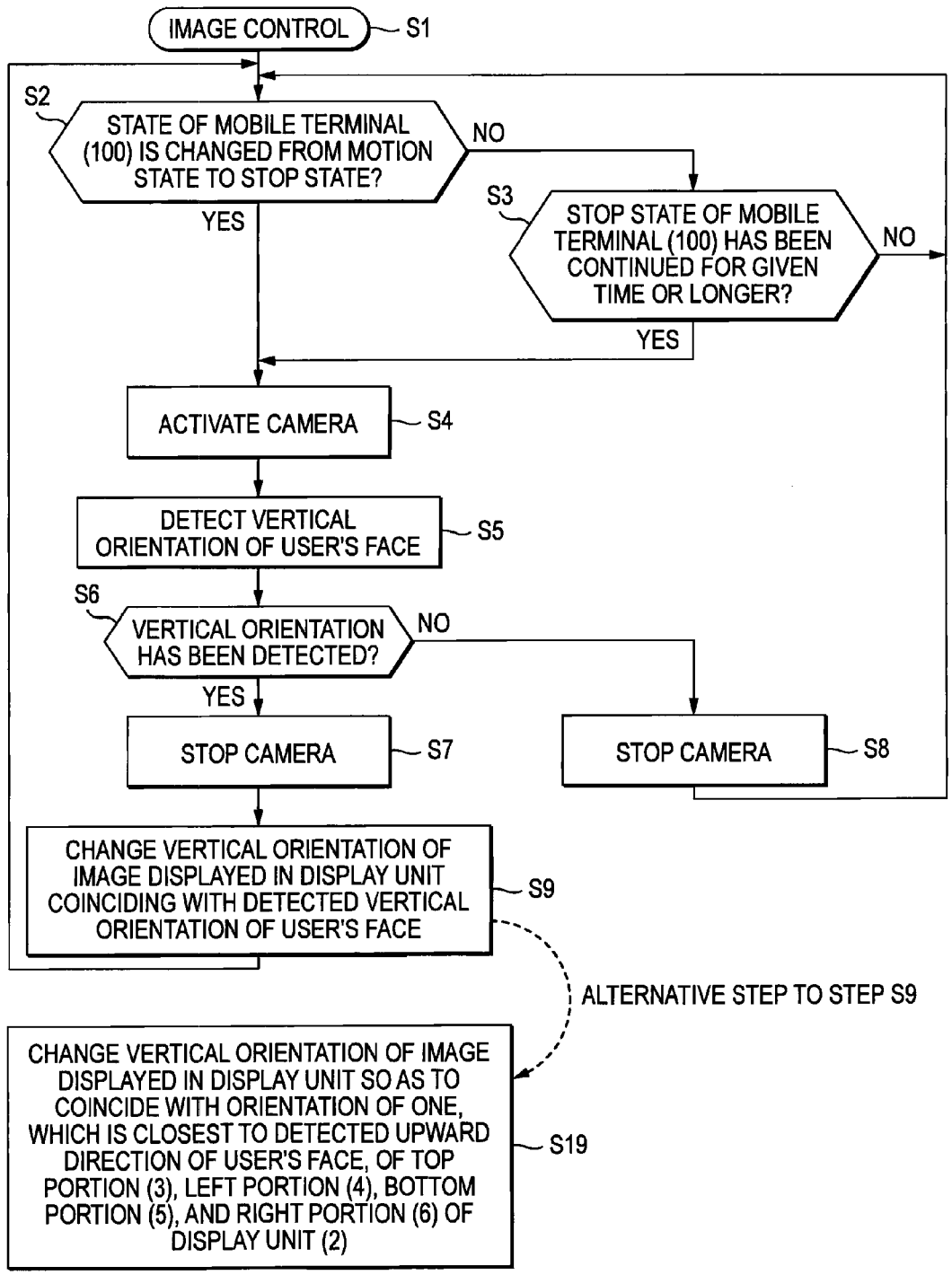

MOBILE APPARATUS

CROSS-REFERENCE TO RELATED APPLICATIONS

The present disclosure relates to the subject matters contained in Japanese Patent Application No. 2009-187457 filed on Aug. 12, 2009, which are incorporated herein by reference in its entirety.

BACKGROUND

1. Field of the Invention

The present invention relates to a camera-attached mobile apparatus, and more particularly, to a mobile apparatus that changes a display orientation of a display object according to a user's viewing direction.

2. Description of Related Art

There are mobile apparatuses that change a display orientation of a display object in accordance with a user's viewing direction (for example, see JP-A-2008-177819 and JP-A-2003-186462). Such mobile apparatuses disclosed in the above-described publications detect a direction of a user's face by using a camera mounted on the mobile apparatus and displays an image, text, or the like in a orientation that coincides with the orientation of the user's face. Accordingly, the display orientation of the display image coincides with the orientation of the user's face without depending on the user's posture or holding method of the mobile apparatus, and thereby the display image can be easily viewed by the user.

As described in JP-A-2008-177819, when an e-mail is received and a display is directed by an input operation in a mobile apparatus, a camera is activated. Thus, a face image is photographed by the camera, a vertical orientation of the face image is determined, and a display orientation of communication data is controlled coincidentally with the vertical orientation of the face image. Then, until the display of the communication data of the e-mail is completed, the face image continues to be photographed by the camera so as to respond to a change in the orientation of the user's face. In addition, when a browser is activated in accordance with an input operation, the camera is activated. Thus, a face image is photographed by the camera, the vertical orientation of the face image is determined, and a display orientation of a browser image is controlled coincidentally with the vertical orientation of the face image. Then, until the display of the browser is completed, the face image continues to be photographed by the camera so as to respond to a change in the orientation of the user's face.

However, in JP-A-2008-177819, the camera is activated all the time in a display state, and accordingly, a power consumption of the camera is large. Therefore, power of a battery of the mobile apparatus is rapidly consumed.

In addition, as described in JP-A-2008-177819, in a case where an orientation of a user's face shown is tilted by an angle θ, an image is generated so as to be tilted by the angle θ in the same orientation as the orientation of the user's face and is displayed on a screen.

In a case where the user views the screen, the orientation of the user's face and a display orientation of the image coincide with each other, and accordingly, the user may easily view the image. However, there are cases where the user has an uneasy feeling when the image is displayed as tilted with respect to a rectangular frame of the screen.

SUMMARY

Illustrative aspects of the present invention provide a mobile apparatus that lowers a power consumption of a camera built in the mobile apparatus and that has a method of displaying an image, text, or the like without giving the user an uneasy feeling, in a case of detecting a orientation of a user's face by the camera and displaying the image, the text, or the like in a orientation that coincides with the orientation of the user's face.

According to an aspect of the invention, there is a mobile apparatus provided with: a display module configured to display an image; a camera disposed on a same side as a side on which the display module is provided and configured to capture a camera image including a user's face; a motion detecting module configured to detect a motion state and a stop state of the mobile apparatus; an image controller configured to determine a face orientation of the user's face from the camera image and control a display orientation of the image to be displayed in the display module; and a camera activating module configured to activate the camera when the motion detecting module detects a change from the motion state to the stop state, and to turn off the camera when the image controller completes a determination on the face orientation.

BRIEF DESCRIPTION OF THE DRAWINGS

An exemplary embodiment of the present invention may be described in detail with reference to the accompanying drawings, in which:

FIGS. 2A to 2F are exemplary diagrams showing a relative relationship among a user, a camera image, and a display image, according to the exemplary embodiment;

FIG. 4 is an exemplary flowchart showing image control of the mobile apparatus according to the exemplary embodiment.

DETAILED DESCRIPTION

Figure 1:
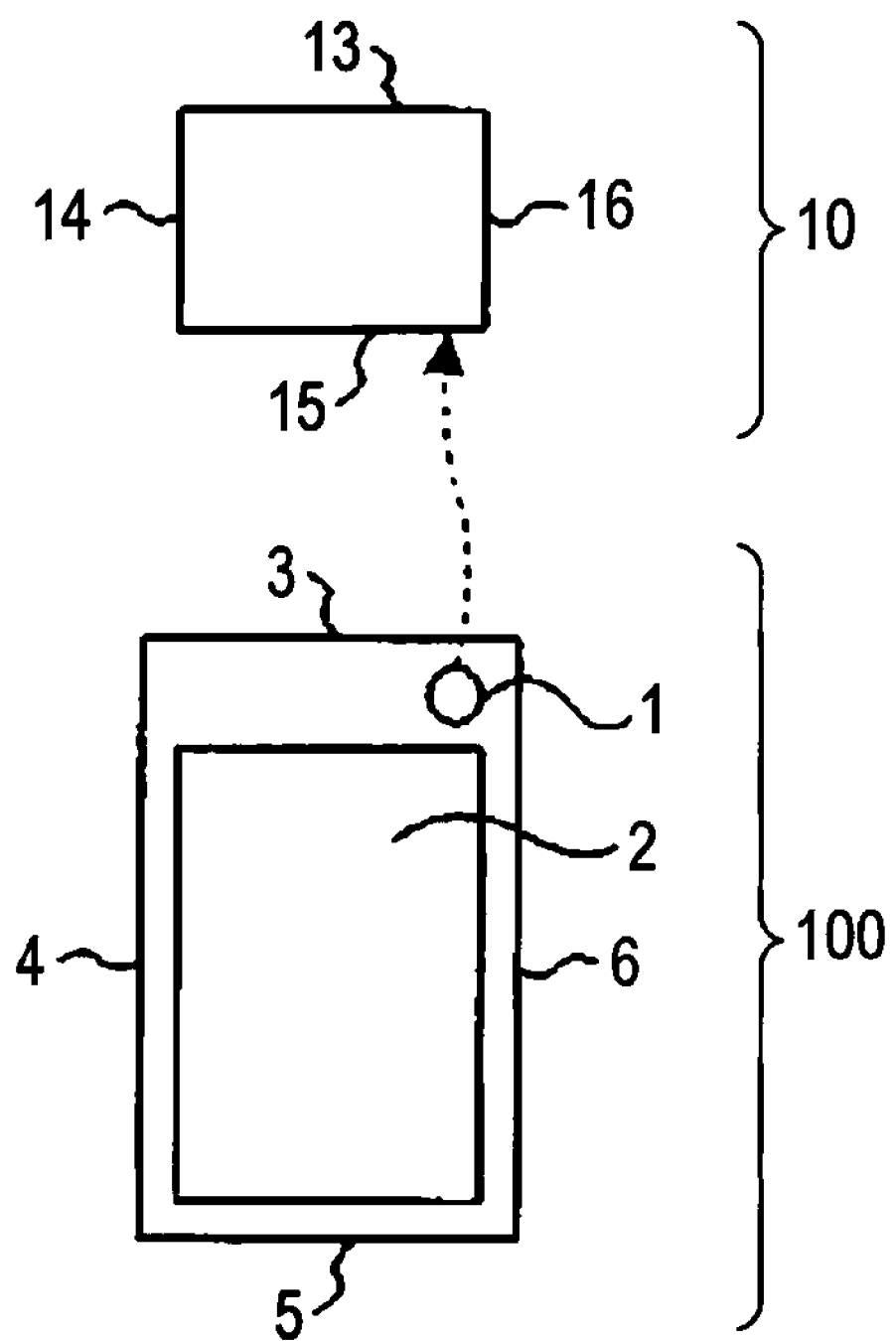
FIG. 1 is an exemplary diagram showing a relative relationship between a mobile apparatus and a camera image according to an exemplary embodiment of the present invention.

FIG. 1 is an exemplary diagram showing a relative relationship between a mobile apparatus 100 and a camera image 10 according to an exemplary embodiment of the present invention. The exemplary diagram shown in FIG. 1 is similar to that described in JP-A-2008-177819 and JP-A-2003-186462 and the like, and description thereof is simplified. On a principal surface side of the mobile apparatus 100, a camera 1, a display unit (display module) 2, and the like are mounted. Since it is premised that the camera 1 photographs a user watching the display unit 2, the camera 1 is disposed on the same side as a side on which the display unit 2 is mounted.

Here, portions of the side face of the mobile apparatus 100 that are positioned in four sides are referred to as a top portion 3, a left portion 4, a bottom portion 5, and a right portion 6. In addition, portions of a camera image 10, which is photographed by the camera 1, positioned in four sides, are referred to as a top portion 13, a left portion 14, a bottom portion 15, and a right portion 16. The orientations of the portions, which are positioned in four sides, of the principal surface of the mobile apparatus 100 and the orientations of the portions, which are positioned in four sides, of the camera image 10 have the same relative relationship all the time even when the mobile apparatus 100 is tilted. As the camera image 10, a mirror image of the image photographed by the camera is assumed to be acquired.

FIGS. 2A to 2F are exemplary diagrams showing a relative relationship among a user, a camera image, and a display image, according to the exemplary embodiment. FIGS. 2A to 2F show a state in which a user watches the principal surface of the mobile apparatus 100 and show a state in which the user is viewed from a back side of the user. The user's face is photographed by the camera 1, and thereby a camera image 10 (mirror image) is acquired. The user watches a display image 22b of the display unit 2.

FIGS. 2A to 2E are similar to a related art and show various relative relationships between a user and the mobile apparatus 100.

FIG. 2A shows a case of a relative relationship in which an upward direction (denoted by an arrow) of a user's face coincides with a direction of the top portion 3 of the mobile apparatus 100. When the user is photographed by the camera 1 in this state, the upward direction (denoted by an arrow) of the user's face of the camera image 10 is the same as the direction of the top portion 13. The display control is performed such that the upward direction (direction of the arrow) of each of various display images 22b, which are displayed in the display unit 2, coincides with the upward direction (the direction of the arrow) of the user's face of the camera image 10. As the display image 22b, for example, there is a text image, a TV image, a Web image, or the like. In FIGS. 2A to 2F, as an example, display of text of "ABC" is displayed. Accordingly, the user views the display image 22b that is in the same orientation as the orientation of the user's face, and thereby the user can easily view the display image 22b.

In addition, FIG. 2B shows a state in which a user views the mobile apparatus 100 to be tilted to a right side by about 25 degrees. Since being a mirror image, a face orientation of the camera image 10 is an orientation which is accordingly tilted to the right side by 25 degrees. The display image 22b is controlled to be displayed with a tilt coinciding with the tilt of the camera image 10.

In addition, FIGS. 2C to 2E show a different state of the relative relationship between a user and the mobile apparatus 100. In such a state, the user can always view the display image 22b with facing the display image 22b.

Since the orientation of the display image is controlled based on the relative relationship between the user and the mobile apparatus 100 as described above, the mobile apparatus 100 can respond to either an upright state or a lying-down state of the user.

FIG. 2F shows the exemplary embodiment of the present invention. In the state of FIG. 2B, the user can view the display image 22b with facing the display image 22b. However, when the display image 22b is tilted with respect to the rectangular frame of the display unit 2, the user often has an uneasy feeling. As a method of preventing such the uneasy feeling, the display image 22b is controlled to be displayed in a orientation that corresponds to an orientation in which one of the top portion 3, the left portion 4, the bottom portion 5, and the right portion 6 of the display unit 2 is in the upward direction, that is, corresponds to an orientation perpendicular to one, which has the tilt closest to the tilt of the user's face of the camera image 10, of four sides of the rectangular frame of the display unit 2, instead of tilting the display image 22b so as to coincide with the tilt of the user's face of the camera image 10 even in a case where the user's face of the camera image 10 is tilted. Accordingly, even in a case where the relative relationship between the user and the mobile apparatus 100 is tilted by 25 degrees, the display is controlled such that the orientation of the display image 22b is in the orientation in which the top portion 3 of the display unit 2, which has the tilt closest to the user's face of the camera image 10, is in the upward direction. Although not shown, for example, in a case where the user is tilted to the right side by 50 degrees, display is controlled such that the orientation of the display image 22b is the orientation in which the right portion 6 of the display unit 2 is in the upward direction.

In FIG. 2F, although the orientation of the user's face and the orientation of the display image 22b do not completely coincide with each other, the display image 22b is horizontal or vertical with respect to the rectangular frame of the display unit 2 in the state in which the orientation of the user's face is close to the orientation of the display image 22b. Accordingly, the uneasy feeling of the user decreases. In addition, in the state in which there is non-coincidence of such an amount of a degree, the user can view the display image 22b without any problem.

Figure 3:
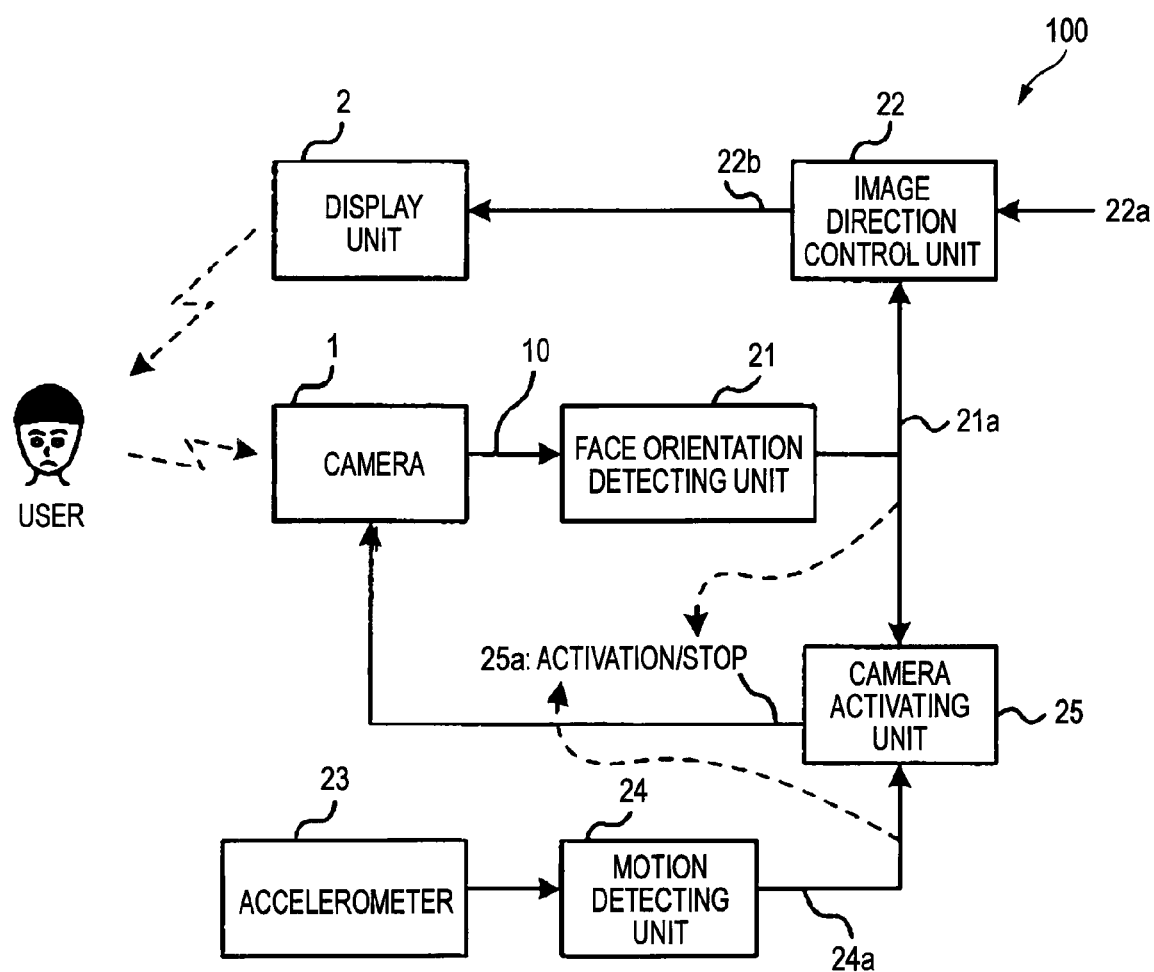
FIG. 3 is an exemplary block diagram showing a related portion of the mobile apparatus according to the exemplary embodiment.

FIG. 3 is an exemplary block diagram showing a related portion of the mobile apparatus 100 according to the exemplary embodiment. The mobile apparatus 100 is configured by the camera 1, the display unit 2, a face orientation detecting unit (face orientation detecting module) 21, an image orientation control unit (image controller) 22, an accelerometer 23, a motion detecting unit (motion detecting module) 24, a camera activating unit (camera activating module) 25, and the like.

The face orientation detecting unit 21 detects the vertical orientation of a user's face by detecting the user's face from the camera image 10 (mirror image) that is transmitted from the camera 1. Then, the face orientation detecting unit 21 transmits a face orientation detection signal 21a to the image orientation control unit 22.

The image orientation control unit 22 rotates display image data 22a such as a text image, a TV image, or a Web image to be in a orientation that is the same as a orientation of the user's face coincidentally with the detected angle of the face orientation detection signal 21a, generates display image 22b, and displays the generated display image 22b in the display unit 2.

Detailed functions of the face orientation detecting unit 21 and the image orientation control unit 22 are described in JP-A-2008-177819 and JP-A-2003-186462 and the like. Thus, detailed description thereof is omitted here.

According to the exemplary embodiment, in FIG. 2F, the image orientation control unit 22 controls the display image 22b to be displayed in a orientation that coincides with a orientation in which one of the top portion 3, the left portion 4, the bottom portion 5, and the right portion 6 of the display unit 2 is in the upward direction, that is, in a orientation perpendicular to one, which has the tilt closest to the tilt of the user's face of the camera image 10, of the four sides of the display unit 2, instead of tilting the display image 22b so as to coincide with the tilt of the user's face of the camera image 10 even in a case where the user's face of the camera image 10 is tilted.

An activation of the camera as another aspect of the exemplary embodiment will be described next. According to the exemplary embodiment, a motion state and a stop state of the mobile apparatus 100 are detected, and turning-on of the power of the camera begins at a time when a state of the mobile apparatus 100 changes from the motion state to the stop state. In addition, in a case where the stop state is continued, the power of the camera is regularly turned on.

The reason for this is for turning on the power of the camera only at a necessary time by determining the vertical orientation of the user's face and controlling the orientation of the display image by turning on the power of the camera at a time when the mobile apparatus 100 is stopped, and thereby controlling the orientation of the display image while saving power. Hereinafter, a detailed description thereof will follow.

The accelerometer 23, for example, is a three-axis accelerometer. The motion detecting unit 24 determines that the mobile apparatus 100 is in motion in a case where a change in each output of the three-axis accelerometer is equal to or greater than a threshold value. On the other hand, the motion detecting unit 24 determines that the mobile apparatus 100 is stopped in a case where the change in each output of the three-axis accelerometer is less than the threshold value.

In the three-axis accelerometer, a gravity acceleration is detected all the time, and slow rotation of the mobile apparatus 100 appears in each output of the three axes as a change in a vector value of the gravity acceleration, and thereby the tilt of the mobile apparatus 100 can be detected. In addition, even in a case where the mobile apparatus 100 is not tilted, when the mobile apparatus 100 is shaken by a user, the acceleration thereof appears as a change in the output of the accelerometer, and thereby the acceleration can be detected. On the other hand, it can be determined that the mobile apparatus 100 is stopped in a case where there is no change in the output of the accelerometer.

Then, the motion detecting unit 24 transmits a signal 24a indicating that there is a change in the state of the mobile apparatus 100 from the motion state to the stopped state to the camera activating unit 25. In addition, in a case where the stopped state is continued, the motion detecting unit 24 transmits the signal 24a to the camera activating unit 25 on a regular basis.

When receiving the signal 24a indicating the stopped state, the camera activating unit 25 sets an activation/stop signal 25a to be in an activated state, and thereby activating the camera 1. Then, the power of the camera 1 is turned on. In other words, the camera 1 is in a wakeup state. In this state, the process of the above-described face orientation detecting unit 21 is performed.

Then, when the face orientation detecting unit 21 detects the vertical orientation of the user's face and notifies the face orientation detection signal 21a, the camera activating unit 25 sets the activation/stop signal 25a to be in a stopped state, thereby stopping the camera 1. And then, the power of the camera 1 is turned off. In other words, the camera 1 is in a sleep state. The sleep state includes a power-saving state by putting into a mode for saving a power consumption while a part of or all power of the camera 1 is turned on.

The functions of the motion detecting unit 24 and the camera activating unit 25 may be shared or be performed by one processor.

FIG. 4 is an exemplary flowchart showing image control of the mobile apparatus 100 according to the exemplary embodiment. When an application for displaying an image in the display unit 2 is started, image control (Step S1) is started.

In the image control, first, it is checked whether the state of the mobile apparatus 100 is changed from the motion state to the stop state by the process of the motion detecting unit 24 (Step S2). In a case where the state of the mobile apparatus 100 is changed to the stop state (YES in Step S2), the camera is activated (Step S4).

In the case where the state of the mobile apparatus 100 is not changed to the stop state (NO in Step S2), it is checked whether the stop state is continued for a given time or longer (Step S3). In the case where the stop state is continued for the given time or longer (YES in Step S3), the camera is activated (Step S4). On the other hand, in a case where "NO" is acquired in Step S2 and in Step S3, a looping process is performed so as to wait for a next process.

On the other hand, in a case where "YES" is acquired in Step S2 and in Step S3, the camera 1 is activated. In other words, in such a case, for example, the power of the camera 1 is turned on, or the camera 1 is set to be in the wakeup state (Step S4). Then, detection of a user's face and detection of a vertical orientation of the user's face are performed from the camera image 10 photographed by the camera 1 (Step S5).

In a case where the vertical orientation of the user's face cannot be detected (NO in Step S6), the camera is stopped, that is, for example, the power of the camera 1 is turned off or the camera 1 is set to be in the sleep state (Step S8), and then the process is returned back to Step S2. On the other hand, in a case where the vertical orientation of the user's face can be detected (YES in Step S6), the camera is stopped (Step S7).

Then, the vertical orientation of the image displayed in the display unit is changed coincidentally with the detected vertical orientation of the user's face (Step S9). Alternatively, in Step S19 as an alternative step to Step S9, the display image 22b is controlled to be displayed in a orientation that coincides with an orientation in which one of the top portion 3, the left portion 4, the bottom portion 5, and the right portion 6 of the display unit 2 is in an upward direction, that is, in a orientation perpendicular to one, which has the tilt closest to the tilt of the user's face of the camera image 10, of the four sides of the rectangular frame of the display unit 2.

In particular, assuming that absolute angles of the right portion 6, the top portion 3, the left portion 4, and the bottom portion 5 are 0 degrees, 90 degrees, 180 degrees, and 270 degrees, respectively, the absolute angle of the display image 22b is controlled to be displayed as below in accordance with the tilt (absolute angle) of the user's face of the camera image 10.

Tilt (Absolute Angle) of User's Face: Absolute Angle of Display Image 22b 0 to 45 degrees: 0 degrees
45 to 90 degrees: 90 degrees
90 to 135 degrees: 90 degrees
135 to 180 degrees: 180 degrees
180 to 225 degrees: 180 degrees
225 to 270 degrees: 270 degrees
270 to 315 degrees: 270 degrees
315 to 360 degrees: 360 degrees Then, the process is returned back to Step S2.

According to the exemplary embodiment, in a case where a user changes the angle of the mobile apparatus 100 while being held in the hands, the camera 1 is activated when the mobile apparatus 100 is in the stop state, and detection of the face orientation and control of the display orientation of the display image 22b are performed. Then, the camera 1 is stopped. In addition, in a case where the stop state of the mobile apparatus 100 is continued as in a case where the mobile apparatus 100 is, for example, placed on a desk, the camera 1 is regularly activated so as to respond to a user's motion which separates from a motion of the mobile apparatus 100, and detection of the face orientation of the user and control of the display orientation of the display image 22b are performed. Then the camera 1 is stopped. Accordingly, the activation time period of the camera 1 is shortened, and thereby power consumption can be reduced.

In addition, instead of controlling the display orientation of the display image 22b coincidentally with the tilt of the user's face, the display orientation of the display image 22b is controlled so as not to tilt with respect to the rectangular frame of the display unit 2 in the state of being close to the tilt of the user's face. Accordingly, a display which does not give the user an uneasy feeling can be acquired.

The present invention is not limited to the foregoing embodiments but various modifications of its component may be made without departing from the scope of the present invention. Also, the components disclosed in the embodiments may be assembled in any combination for embodying the present invention. For example, some of the components may be omitted from all the components disclosed in the embodiments. Further, components in different embodiments may be appropriately combined.

What is claimed is:

1. A mobile apparatus comprising:
a display module configured to display an image;
a camera disposed on a same side as a side on which the display module is provided and configured to capture a camera image including a user's face;
a motion detecting module configured to detect a motion state and a stop state of the mobile apparatus;
an image controller configured to determine a face orientation of the user's face from the camera image and control a display orientation of the image to be displayed in the display module; and
a camera activating module configured to activate the camera when the motion detecting module detects a change from the motion state to the stop state, and to turn off the camera when the image controller completes a determination on the face orientation.

2. The apparatus of claim 1 further comprising:
an accelerometer configured to output signals,
wherein the motion detecting module is configured to detect the motion state and the stop state based on a change of the signals.

3. The apparatus of claim 2,
wherein the accelerometer includes a three-axis accelerometer, and
wherein the motion detecting module is configured to determine that the mobile apparatus is in the motion state when the change of the signals is equal to or greater than a threshold value, and to determine that the mobile apparatus is in the stop state when the change of the signals is less than the threshold value.

4. The apparatus of claim 1, wherein the image controller and the camera activating module are put in one of an OFF state and a power-saving state when the camera is in one of the OFF state and the power-saving state.

5. A mobile apparatus comprising:
a display module configured to display an image;
a camera disposed on a same side as a side on which the display module is provided and configured to capture a camera image including a user's face;
a motion detecting module configured to detect a motion state and a stop state of the mobile apparatus;
an image controller configured to determine a face orientation of the user's face from the camera image and control a display orientation of the image to be displayed in the display module; and
a camera activating module configured to regularly activate the camera when the motion detecting module detects that the stop state continues for a given period, and to turn off the camera when the image controller completes a determination on the face orientation.

6. The apparatus of claim 5 further comprising:
an accelerometer configured to output signals,
wherein the motion detecting module is configured to detect the motion state and the stop state based on a change of the signals.

7. The apparatus of claim 6,
wherein the accelerometer includes a three-axis accelerometer, and
wherein the motion detecting module is configured to determine that the mobile apparatus is in the motion state when the change of the signals is equal to or greater than a threshold value, and to determine that the mobile apparatus is in the stop state when the change of the signals is less than the threshold value.

8. The apparatus of claim 5, wherein the image controller and the camera activating module are put in one of an OFF state and a power-saving state when the camera is in one of the OFF state and the power-saving state.

9. A mobile apparatus comprising:
a display module configured to display an image;
a camera disposed on a same side as a side on which the display module is provided and configured to capture a camera image including a user's face;
an image controller configured to determine a face orientation of the user's face from the camera image, and to control a display orientation of the image to be displayed in the display module so that the display orientation is in a orientation in which one, which is the closest to an upward orientation of the user's face, of four sides of a rectangular frame of the display module is in the upward orientation;
a motion detecting module configured to detect a motion state and a stop state of the mobile apparatus; and
a camera activating module configured to activate the camera when the motion detecting module detects a change from the motion state to the stop state, and to turn off the camera when the image controller completes a determination on the face orientation.

10. The apparatus of claim 9, wherein the image controller and the camera activating module are put in one of an OFF state and a power-saving state when the camera is in one of the OFF state and the power-saving state.

11. The apparatus of claim 9 further comprising:
a motion detecting module configured to detect a motion state and a stop state of the mobile apparatus; and
a camera activating module configured to regularly activate the camera when the motion detecting module detects that the stop state continues for a given period, and to turn off the camera when the image controller completes a determination on the face orientation.

12. The apparatus of claim 11, wherein the image controller and the camera activating module are put in one of an OFF state and a power-saving state when the camera is in one of the OFF state and the power-saving state.

13. The apparatus of claim 9 further comprising:
an accelerometer configured to output signals,
wherein the motion detecting module is configured to detect the motion state and the stop state based on a change of the signals.

14. The apparatus of claim 9 further comprising:
an accelerometer configured to output signals,
wherein the motion detecting module is configured to detect the motion state and the stop state based on a change of the signals.

15. The apparatus of claim 11 further comprising:
an accelerometer configured to output signals,
wherein the motion detecting module is configured to detect the motion state and the stop state based on a change of the signals.

16. The apparatus of claim 13,
wherein the accelerometer includes a three-axis accelerometer, and
wherein the motion detecting module is configured to determine that the mobile apparatus is in the motion state when the change of the signals is equal to or greater than a threshold value, and to determine that the mobile apparatus is in the stop state when the change of the signals is less than the threshold value.

17. The apparatus of claim 14,
wherein the accelerometer includes a three-axis accelerometer, and
wherein the motion detecting module is configured to determine that the mobile apparatus is in the motion state when the change of the signals is equal to or greater than a threshold value, and to determine that the mobile apparatus is in the stop state when the change of the signals is less than the threshold value.

18. The apparatus of claim 15,
wherein the accelerometer includes a three-axis accelerometer, and
wherein the motion detecting module is configured to determine that the mobile apparatus is in the motion state when the change of the signals is equal to or greater than a threshold value, and to determine that the mobile apparatus is in the stop state when the change of the signals is less than the threshold value.

\* \* \* \* \*